United States Patent
Kim et al.

(10) Patent No.: US 11,949,509 B2
(45) Date of Patent: Apr. 2, 2024

(54) METHOD AND DEVICE FOR TRANSMITTING AND RECEIVING DATA CHANNEL IN WIRELESS COMMUNICATION SYSTEM

(71) Applicant: Samsung Electronics Co., Ltd., Suwon-si (KR)

(72) Inventors: Taehyoung Kim, Suwon-si (KR); Youngbum Kim, Suwon-si (KR); Younsun Kim, Suwon-si (KR); Seunghoon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 398 days.

(21) Appl. No.: 16/973,234

(22) PCT Filed: Jun. 7, 2019

(86) PCT No.: PCT/KR2019/006858
§ 371 (c)(1),
(2) Date: Dec. 8, 2020

(87) PCT Pub. No.: WO2019/240433
PCT Pub. Date: Dec. 19, 2019

(65) Prior Publication Data
US 2021/0242968 A1 Aug. 5, 2021

(30) Foreign Application Priority Data
Jun. 11, 2018 (KR) .......................... 10-2018-0067033

(51) Int. Cl.
*H04L 1/00* (2006.01)
*H04L 5/00* (2006.01)
(Continued)

(52) U.S. Cl.
CPC .......... *H04L 1/0071* (2013.01); *H04L 5/0005* (2013.01); *H04W 72/0466* (2013.01); *H04W 72/23* (2023.01); *H04W 76/11* (2018.02)

(58) Field of Classification Search
None
See application file for complete search history.

(56) References Cited

U.S. PATENT DOCUMENTS

2009/0132872 A1  5/2009  Leung et al.
2010/0118800 A1* 5/2010  Kim ...................... H04L 1/0071
370/329

(Continued)

OTHER PUBLICATIONS

ETRI: Signature generation and structure of LSSA, R-1802069, Athens, Greece, Feb. 26, 2018-Mar. 2, 2018.

(Continued)

*Primary Examiner* — Christopher T Wyllie
(74) *Attorney, Agent, or Firm* — Jefferson IP Law, LLP

(57) ABSTRACT

Provided is a communication method using a non-orthogonal multiple access scheme of a terminal, the communication method including: obtaining configuration information about a transmission pattern of the terminal; determining a terminal-specific transmission pattern, based on the obtained configuration information; processing data to be transmitted, based on the determined terminal-specific transmission pattern; and transmitting the processed data.

13 Claims, 7 Drawing Sheets

(51) Int. Cl.
*H04W 72/044* (2023.01)
*H04W 72/23* (2023.01)
*H04W 76/11* (2018.01)

(56) References Cited

U.S. PATENT DOCUMENTS

| | | | | |
|---|---|---|---|---|
| 2014/0269492 | A1* | 9/2014 | Forenza | H04B 7/0626 |
| | | | | 370/328 |
| 2014/0302811 | A1* | 10/2014 | Chen | H04W 24/10 |
| | | | | 455/405 |
| 2016/0183276 | A1* | 6/2016 | Marinier | H04W 72/12 |
| | | | | 370/329 |
| 2017/0013599 | A1 | 1/2017 | Sun et al. | |
| 2017/0230939 | A1* | 8/2017 | Rudolf | H04L 12/1863 |
| 2017/0288817 | A1* | 10/2017 | Cao | H04L 1/1812 |
| 2018/0048348 | A1 | 2/2018 | Gau et al. | |
| 2018/0123765 | A1* | 5/2018 | Cao | H04L 1/1819 |
| 2018/0337816 | A1* | 11/2018 | Herath | H04L 27/362 |
| 2019/0158338 | A1* | 5/2019 | Herath | H04L 27/3488 |
| 2019/0253193 | A1* | 8/2019 | Kim | H04L 5/0055 |
| 2019/0254018 | A1* | 8/2019 | Li | H04W 72/51 |
| 2019/0268923 | A1* | 8/2019 | Sundararajan | H04W 72/23 |
| 2019/0342910 | A1* | 11/2019 | Cao | H04L 5/0091 |
| 2020/0259550 | A1* | 8/2020 | Falkenstein, Jr. | H01Q 21/28 |
| 2021/0067300 | A1* | 3/2021 | Pan | H04B 17/309 |
| 2021/0100002 | A1* | 4/2021 | Pan | H04L 5/0051 |
| 2021/0409894 | A1* | 12/2021 | Begleiter | H04W 4/33 |

OTHER PUBLICATIONS

Extended European Search Report dated Jul. 1, 2021, issued in European Patent Application No. 19818809.6.
Intel Corporation, Noma related procedure, R1-1806533, 3GPP TSG RAN WG1 Meeting #93, Busan, Korea, May 21, 2018.
Spreadtrum Communications, Considerations on NOMA procedures, R1-1806405, 3GPP TSG RAN WG1 Meeting #93, Busan, Korea, May 21, 2018.
Samsung, Discussion on NoMA related procedure, R1-1806753, 3GPP TSG RAN WG1 Meeting #93, Busan, Korea, May 21, 2018.
Zte et al., Summary of offline email discussion on Tx side processing and receiver types for clarification, R1-1805535, 3GPP TSG RAN WG1 Meeting#92bis, Sanya, China, Apr. 16, 2018.
Hoshyar et al., Novel Low-Density Signature for Synchronous CDMA Systems Over AWGN Channel, IEEE TSP, Apr. 2008.
International Search Report dated Sep. 10, 2019, issued in International Application No. PCT/KR2019/006858.
Korean Office Action dated Aug. 17, 2022, issued in Korean Patent Application No. 10-2018-0067033.
Korean Office Action dated Feb. 27, 2023, issued in Korean Patent Application No. 10-2018-0067033.
European Office Action dated Jan. 16, 2023, issued in European Patent Application No. 19818809.6.

* cited by examiner

METHOD AND DEVICE FOR TRANSMITTING AND RECEIVING DATA CHANNEL IN WIRELESS COMMUNICATION SYSTEM

TECHNICAL FIELD

The disclosure relates to a method and apparatus for transmitting and receiving a data channel in a wireless communication system.

BACKGROUND ART

To meet the increase in demand with respect to wireless data traffic after the commercialization of 4th generation (4G) communication systems, considerable efforts have been made to develop pre-5th generation (5G) communication systems or 5G communication systems. This is one reason why '5G communication systems' or 'pre-5G communication systems' are called 'beyond 4G network communication systems' or 'post Long-Term Evolution (LTE) systems.' In order to achieve a high data rate, 5G communication systems are being developed to be implemented in a super-high frequency band (millimeter wave (mmWave)), e.g., a band of 60 GHz. In order to reduce the path loss of radio waves in such a super-high frequency band and to increase a transmission distance of radio waves in 5G communication systems, various technologies have been discussed and are being studied, for example: beamforming, massive multiple-input multiple-output (MIMO), full dimensional MIMO (FD-MIMO), array antennas, analog beam-forming, and large-scale antennas. In order to improve system networks for 5G communication systems, various technologies have been developed, e.g., evolved small cells, advanced small cells, cloud radio access networks (Cloud-RAN), ultra-dense networks, device-to-device communication (D2D), wireless backhaul, moving networks, cooperative communication, coordinated multi-points (CoMP), and interference cancellation. Also, for 5G communication systems, other technologies have been developed, e.g., hybrid frequency-shift keying (FSK) and quadrature amplitude modulation (QAM) (FQAM) and sliding window superposition coding (SWSC), which are advanced coding modulation (ACM) schemes, and filter bank multi carrier (FBMC), non-orthogonal multiple access (NOMA) and sparse code multiple access (SCMA), which are advanced access schemes.

The Internet has evolved from a human-based connection network, where humans create and consume information, to the Internet of things (IoT), where distributed components, such as objects, exchange information with each other to process the information. Internet of everything (IoE) technology is emerging, in which technology related to the IoT is combined with, for example, technology for processing big data through connection with a cloud server. In order to implement the IoT, various technological components are required, such as sensing technology, wired/wireless communication and network infrastructures, service interface technology, security technology, etc. In recent years, technologies including a sensor network for connecting objects, machine to machine (M2M) communication, machine type communication (MTC), etc. have been studied. In the IoT environment, intelligent Internet technology (IT) services may be provided to collect and analyze data obtained from objects connected to each other to create new value in human life. As existing information technology (IT) techniques and various industries converge and combine with each other, the IoT may be applied to various fields, such as smart homes, smart buildings, smart cities, smart cars or connected cars, smart grids, health care, smart home appliances, high quality medical services, etc.

Various attempts are being made to apply 5G communication systems to the IoT network. For example, technologies related to sensor networks, M2M communication, MTC, etc., are being implemented by using 5G communication technology including beam-forming, MIMO, array antennas, etc. The application of Cloud-RAN as a big data processing technology described above may be an example of convergence of 5G communication technology and IoT technology.

As described above, various services may be provided due to the development of wireless communication systems, and thus there is need for methods of smoothly providing such services.

DESCRIPTION OF EMBODIMENTS

Technical Problem

Provided are an apparatus and method for effectively providing a service in a mobile communication system.

Technical Solution to Problem

Provided are a method and apparatus for transmitting and receiving data according to a transmission pattern of a terminal.

Advantageous Effects of Disclosure

According to embodiments, a service can be effectively provided in a mobile communication system.

BEST MODE

Figure 1:
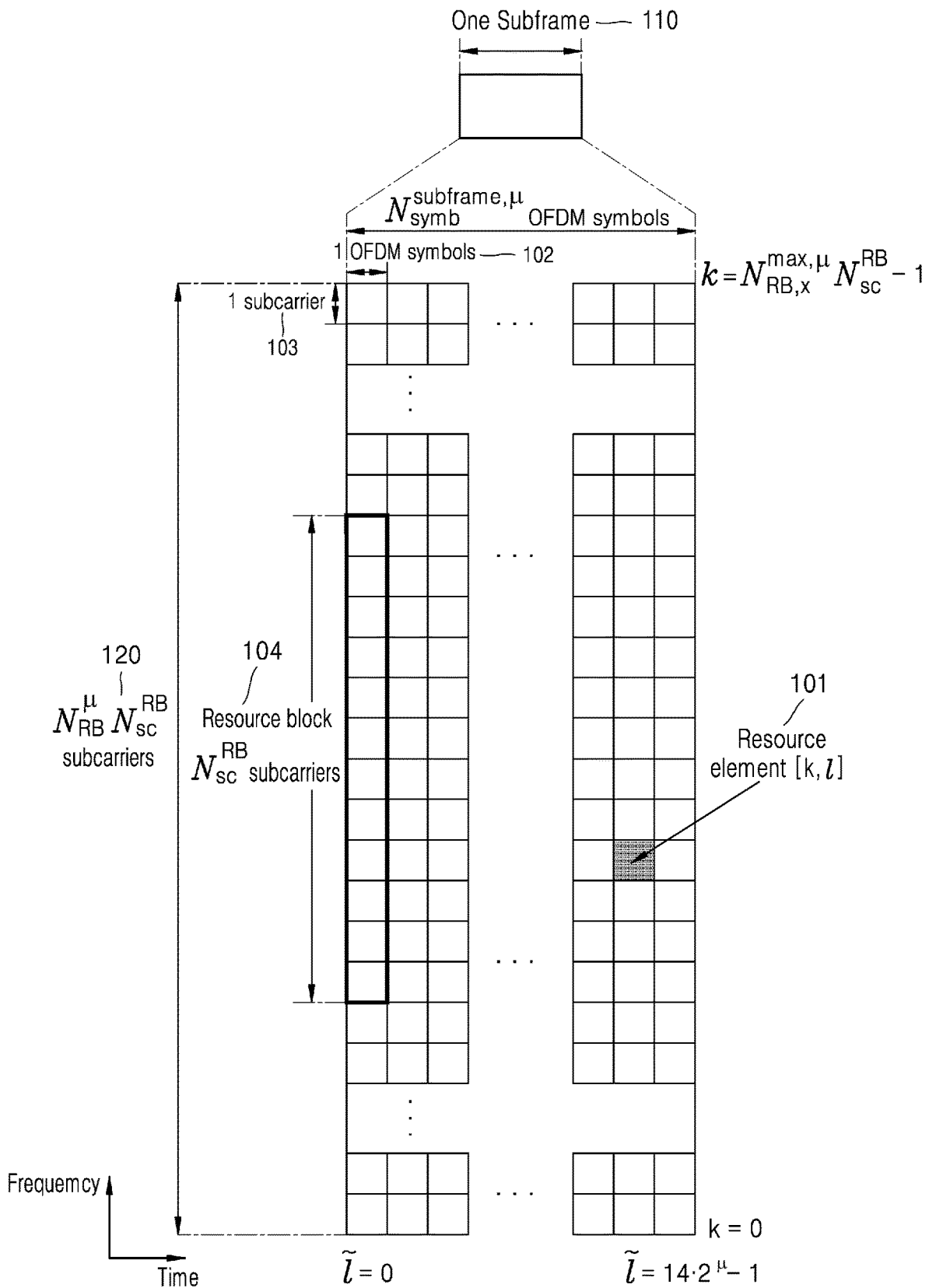
FIG. 1 is a diagram of a base structure of a time-frequency domain that is a radio resource region in a 5th generation (5G), long-term evolution (LTE), or similar system, according to some embodiments.

According to an embodiment of the present disclosure, a communication method using a non-orthogonal multiple access scheme of a terminal includes: obtaining configuration information about a transmission pattern of the terminal; determining a terminal-specific transmission pattern, based on the obtained configuration information; processing data to be transmitted, based on the determined terminal-specific transmission pattern; and transmitting the processed data.

The configuration information about the transmission pattern of the terminal may include information about a transmission pattern to be used by the terminal, and the obtaining of the configuration information about the transmission pattern of the terminal may include obtaining, from higher layer signaling or layer 1 (L1) signaling, the information about the transmission pattern to be used by the terminal.

The configuration information about the transmission pattern of the terminal may include at least one transmission pattern candidate set, and the obtaining of the configuration information about the transmission pattern of the terminal may include obtaining the at least one transmission pattern candidate set from higher layer signaling or L1 signaling.

The determining of the terminal-specific transmission pattern, based on the obtained configuration information may include selecting one transmission pattern candidate set or selecting the terminal-specific transmission pattern, based on an identifier of the terminal or a certain radio network temporary identifier (RNTI) corresponding to the terminal.

The configuration information about the transmission pattern of the terminal may include base pattern information, and the obtaining of the configuration information about the transmission pattern of the terminal may include obtaining the base pattern information from higher layer signaling or L1 signaling.

The determining of the terminal-specific transmission pattern, based on the obtained configuration information may include determining a number of repeated applications of the base pattern information, based on an identifier of the terminal or a certain RNTI corresponding to the terminal.

The determining of the terminal-specific transmission pattern, based on the obtained configuration information may include determining the terminal-specific transmission pattern, based on an index of a slot or resource block (RB) by which the terminal transmits the data.

The processing of the data to be transmitted, based on the determined terminal-specific transmission pattern may include performing at least one of bit-wise scrambling, bit-wise interleaving, symbol-wise spreading, symbol-wise interleaving, power assignment control, and resource element (RE) assignment control on the data to be transmitted, based on the determined terminal-specific transmission pattern.

According to an embodiment of the present disclosure, a communication method using a non-orthogonal multiple access scheme of a base station includes transmitting configuration information about a transmission pattern of a terminal; receiving data processed according to a terminal-specific transmission pattern determined based on the configuration information about the transmission pattern; and detecting data corresponding to the terminal from the received data, based on the terminal-specific transmission pattern.

The transmitting of the configuration information about the transmission pattern of the terminal may include transmitting the configuration information about the transmission pattern of the terminal from higher layer signaling or layer 1 (L1) signaling.

According to an embodiment of the present disclosure, a terminal using a non-orthogonal multiple access scheme includes: a transceiver; and at least one controller combined with the transceiver and configured to obtain configuration information about a transmission pattern of the terminal, determine a terminal-specific transmission pattern based on the obtained configuration information, process data to be transmitted based on the determined terminal-specific transmission pattern, and transmit the processed data.

The configuration information about the transmission pattern of the terminal may include at least one transmission pattern candidate set, and the at least one controller may be further configured to obtain the at least one transmission pattern candidate set from higher layer signaling or L1 signaling.

The configuration information about the transmission pattern of the terminal may include base pattern information, and the at least one controller may be further configured to obtain the base pattern information from higher layer signaling or L1 signaling.

The at least one controller may be further configured to determine a number of repeated applications of the base pattern information, based on an identifier of the terminal or a certain radio network temporary identifier (RNTI) corresponding to the terminal.

According to an embodiment of the present disclosure, a base station using a non-orthogonal multiple access scheme includes a transceiver; and at least one controller combined with the transceiver and configured to transmit configuration information about a transmission pattern of a terminal, receive data processed according to a terminal-specific transmission pattern determined based on the configuration information about the transmission pattern, and detect data corresponding to the terminal from the received data, based on the terminal-specific transmission pattern.

MODE OF DISCLOSURE

Hereinafter, the present disclosure will be described in detail with reference to accompanying drawings.

In describing embodiments, descriptions of technical contents that are well known in the technical field to which the present disclosure belongs and are not directly related to the present disclosure will be omitted. By omitting the unnecessary description, the gist of the present disclosure may be more clearly conveyed without obscuring the subject matter.

For the same reasons, components may be exaggerated, omitted, or schematically illustrated in drawings for clarity. Also, the size of each component does not completely reflect the actual size. In the drawings, like reference numerals denote like elements.

Advantages and features of the present disclosure and methods of accomplishing the same may be understood more readily by reference to the following detailed description of the embodiments and the accompanying drawings. In this regard, the embodiments of the present disclosure may have different forms and should not be construed as being limited to the descriptions set forth herein. Rather, these embodiments are provided so that the present disclosure will be thorough and complete and will fully convey the concept of the present disclosure to one of ordinary skill in the art, and the present disclosure will only be defined by the appended claims. Throughout the specification, like reference numerals denote like elements. While describing the present disclosure, detailed description of related well-known functions or configurations may be omitted when it is deemed that they may unnecessarily obscure the essence of the present disclosure. Also, terms used below are defined in consideration of functions in the present disclosure, and may have different meanings according to an intention of a user or operator, customs, or the like. Thus, the terms should be defined based on the description throughout the specification.

Hereinafter, a base station is an entity that assigns resources of a terminal, and may be at least one of a next generation node B (gNB), an evolved node B (eNB), a node B (NB), a base station (BS), a wireless access unit, a base station controller, or a node on a network. Examples of a terminal may include user equipment (UE), a mobile station (MS), a cellular phone, a smartphone, a computer, and a multimedia system capable of performing a communication function. In the present disclosure, a downlink (DL) is a wireless transmission path of a signal transmitted from a base station to a terminal, and an uplink (UL) is a wireless transmission path of a signal transmitted from a terminal to a base station. Also, hereinbelow, a long-term evolution (LTE) or LTE-A system may be described as an example, but an embodiment of the present disclosure may also be applied to other communication systems having a similar technical background or channel form. For example, a 5th generation (5G) new radio (NR) mobile communication technology developed after LTE-A may be included in a system to which an embodiment of the present disclosure is applicable, and hereinafter, 5G may be a concept including an existing LTE, LTE-A or similar service. Also, it will be understood by one of ordinary skill in the art that the present disclosure may be applied to other communication systems through some modifications without departing from the scope of the disclosure.

Here, it will be understood that combinations of blocks in flowcharts or process flow diagrams may be performed by computer program instructions. Because these computer program instructions may be loaded into a processor of a general-purpose computer, a special purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated successively may actually be executed substantially concurrently, or the blocks may sometimes be performed in a reverse order according to the corresponding function.

Here, the term "unit" in the embodiments of the disclosure means a software component or hardware component such as a field-programmable gate array (FPGA) or an application-specific integrated circuit (ASIC), and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units". Furthermore, the components and "units" may be embodied to reproduce one or more central processing units (CPUs) in a device or security multimedia card. Also, in the embodiments, the "unit" may include at least one processor.

Wireless communication systems have been developed from wireless communication systems providing voice centered services in the early stage toward broadband wireless communication systems providing high-speed, high-quality packet data services, like communication standards of high speed packet access (HSPA), long term evolution (LTE or evolved universal terrestrial radio access (E-UTRA)), LTE-advanced (LTE-A), and LTE-Pro of the 3GPP, high rate packet data (HRPD) and ultra mobile broadband (UMB) of 3GPP2, IEEE 802.16e or the like.

As a representative example of the broadband wireless communication system, the LTE system has adopted an orthogonal frequency division multiplexing (OFDM) scheme in a downlink (DL) and has adopted a single carrier frequency division multiple access (SC-FDMA) scheme in an uplink (UL). The UL refers to a radio link through which a terminal (a user equipment (UE) or a mobile station (MS)) transmits data or a control signal to a base station (BS) (e.g., eNode B), and the DL refers to a radio link through which a BS transmits data or a control signal to a terminal. Multiple access scheme generally assigns and operates time-frequency resources including data or control information to be transmitted to each other to prevent the time-frequency resources from overlapping with each other, that is, establish orthogonality, thereby dividing the data or the control information of each user.

As a future communication system after the LTE system, that is, a 5G communication system, has to be able to freely reflect various requirements of a user and a service provider, and thus, services satisfying various requirements at the same time need to be supported. The services considered for the 5G communication system include enhanced mobile broadband (eMBB), massive machine type communication (mMTC), ultra reliability low latency communication (hereinafter, URLLC), etc.

According to some embodiments, the eMBB aims to provide a higher data rate than a data rate supported by the LTE, LTE-A, or LTE-Pro system. For example, in the 5G communication system, the eMBB should be able to provide a peak data rate of 20 Gbps in a downlink and a peak data rate of 10 Gbps in an uplink from the viewpoint of one base station. In addition, the 5G communication system may provide the increased user perceived data rate of the terminal simultaneously with providing the peak data rate. In order to satisfy such requirements, the 5G communication system may require improvement of various transmitting/receiving technologies including a further enhanced multiple-input and multiple-output (MIMO) transmission technology. In addition, signals are transmitted using a transmission bandwidth of up to 20 MHz in a 2 GHz band used by the current LTE system, but the 5G communication system uses a bandwidth wider than 20 MHz in a frequency band of 3 to 6 GHz or more than 6 GHz, thereby satisfying a data rate required in the 5G communication system.

At the same time, the mMTC is being considered to support application services such as Internet of things (IoT) in the 5G communication system. The mMTC is required for an access support of a large-scale terminal in a cell, coverage enhancement of a terminal, improved battery time, and cost reduction of a terminal in order to efficiently provide the IoT. The IoT needs to be able to support a large number of terminals (e.g., 1,000,000 terminals/km2) in a cell because it is attached to various sensors and various devices to provide communication functions. In addition, the terminals supporting the mMTC are more likely to be positioned in shaded areas not covered by a cell, such as the underground of a building due to nature of services, and thus, the mMTC may require a wider coverage than other services provided by the 5G communication system. The terminals that support the mMTC should be configured as inexpensive terminals and require very long battery lifetime, such as 10 to 15 years, because it is difficult to frequently replace batteries of the terminals.

Finally, the URLLC that is a cellular-based wireless communication service used for mission-critical purposes may be used, for example, in remote control for robots or machinery, industrial automation, unmanaged aerial vehicles, remote health care, or emergency alert. Accordingly, communication provided by the URLLC should provide very low latency and very high reliability (ultra-high reliability). For example, a service supporting the URLLC should satisfy air interface latency smaller than 0.5 milliseconds and at the same time, may have a packet error rate of 10-5 or less. Accordingly, for URLLC-supportive services, the 5G communication system may be required to provide a transmit time interval (TTI) shorter than those for other services while securing reliable communication links by assigning a broad resource in a frequency band.

The three services, that is, eMBB, URLLC, and mMTC, considered in the above 5G communication system may be multiplexed in one system and may be transmitted. In this case, the services may use different transmission and reception methods and transmission and reception parameters in order to meet their different requirements. However, the mMTC, URLLC, and eMBB are examples of different service types, and service types to which the disclosure is applied are not limited thereto. The present disclosure suggests a data channel transmission method for non-orthogonal multiple access (NOMA) support in a wireless communication system. NOMA may denote a technology of providing a communication service to a plurality of terminals in same time and frequency resources. For example, in the same time and frequency resources, the plurality of terminals may transmit an uplink (or downlink) data channel.

Considering transmission and reception for the uplink data channel, a receiving end may be a base station and a transmitting end may be a terminal. A terminal-specific transmission technique of a bit-level or symbol-level may be applied to the transmitting end for the base station to distinguish data channels transmitted from different terminals. The terminal-specific transmission technique may include, for example, terminal-specific interleaving, terminal-specific spreading, and terminal-specific scrambling, and a pattern corresponding to the terminal-specific transmission technique may be referred to as a multiple access signature. In the present disclosure, as a scheme of performing the terminal-specific interleaving, a method of applying a terminal-specific cyclic shift, a method of using a terminal-specific interleaver size, or a method of performing terminal-specific inter-column permutation is proposed. Also, the present disclosure proposes various signaling methods of assigning a terminal-specific multiple access signature to each terminal.

Random interleaving may be performed on different terminals via an interleaving scheme for data bits and symbols proposed in the present disclosure, and accordingly, the receiving end may effectively distinguish the data channels of the different terminals. Also, the data channels of the terminals performing NOMA may be effectively distinguished via a method of assigning a multiple access signature, proposed in the present disclosure.

Hereinafter, a frame structure of a 5G system will be described in detail with reference to accompanying drawings.

FIG. 1 is a diagram of a base structure of a time-frequency domain that is a radio resource region in a 5G, LTE, or similar system where a data or control channel is transmitted, according to some embodiments.

In FIG. 1, a horizontal axis represents a time domain and a vertical axis represents a frequency domain. In the time and frequency domain, a base unit of a resource is a resource element (RE) 101, and the RE may be defined by one OFDM symbol 102 in a time axis and one subcarrier 103 in a frequency axis. In the frequency domain, $N_{sc}^{RB}$ (for example, 12) consecutive REs may configure one resource block (RB) 104.

Figure 2:
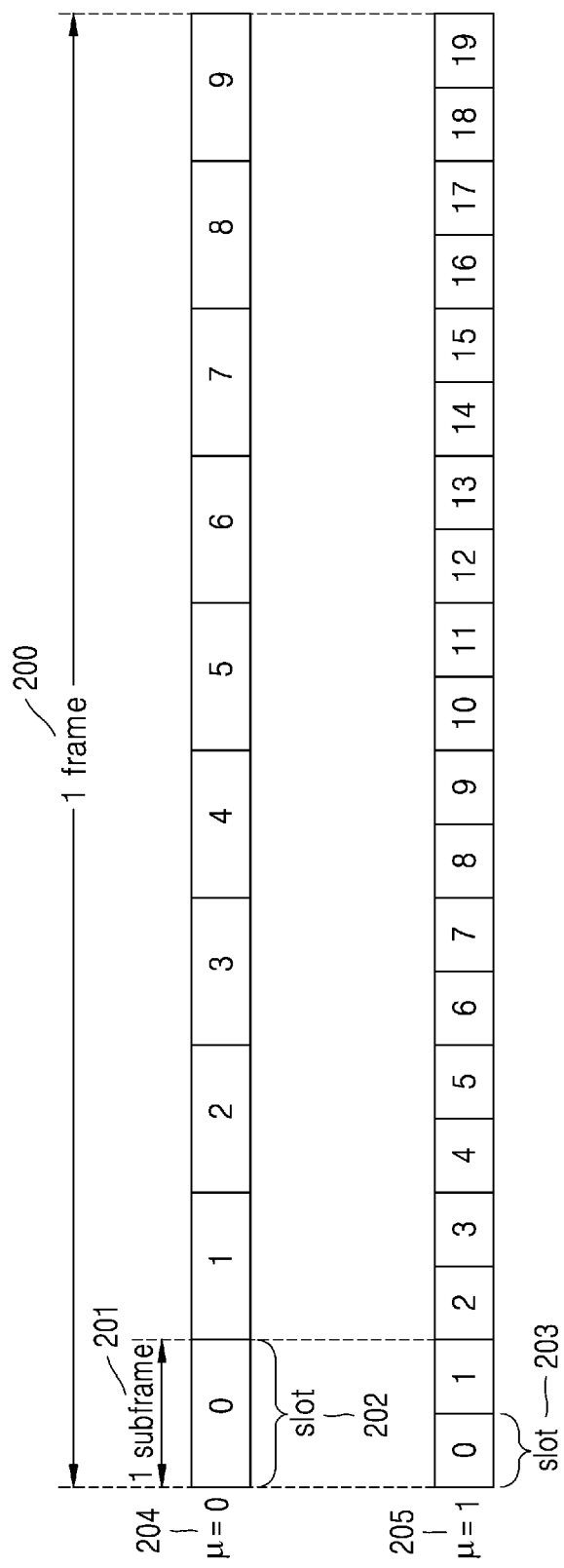
FIG. 2 is a diagram of a slot structure in a 5G, LTE, or similar system, according to some embodiments.

FIG. 2 is a diagram of a slot structure in a 5G, LTE, or similar system, according to some embodiments.

FIG. 2 illustrates an example of structures of a frame 200, a subframe 201, and a slot 202. According to some embodiments, one frame 200 may be defined to be 10 ms. One subframe 201 may be defined to be 1 ms, and accordingly, one frame 200 may include total 10 subframes 201. One slot 202 or 203 may be defined by 14 OFDM symbols (i.e., a number $N_{symb}^{slot}$ of symbols per slot=14). One subframe 201 may include one or more slots 202 and 203, and a number of slots 202 and 203 per subframe 201 may depend on configuration values µ 204 and 205 for subcarrier spacing. However, the present disclosure is not limited to the above examples.

Referring to FIG. 2, a case where µ=0 204 and µ=1 205 are shown as the configuration values for subcarrier spacing. When µ=0 204, one subframe 201 may include one slot 202, and when µ=1 205, one subframe 201 may include two slots 203. In other words, a number $S_{slot}^{subframe,\mu}$ of slots per subframe may vary depending on the configuration value µ for subcarrier spacing, and accordingly, a number $N_{slot}^{frame,\mu}$ of slots per frame may vary. $N_{slot}^{subframe,\mu}$ and $N_{slot}^{frame,\mu}$ according to configuration µ for each subcarrier spacing may be defined as Table 1 below.

TABLE 1

| µ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Next, downlink control information (DCI) in the 5G system will be described in detail.

According to some embodiments, in the 5G system, scheduling information for uplink data (or physical uplink shared channel (PUSCH)) or downlink data (or physical downlink shared channel (PDSCH)) may be transmitted from a base station to a terminal via DCI. The terminal may monitor a fallback DCI format and a non-fallback DCI format for PUSCH or PDSCH. The fallback DCI format may include a fixed field pre-defined between the base station and the terminal, and the non-fallback DCI format may include a configurable field.

The DCI may be transmitted through a physical downlink control channel (PDCCH) via channel coding and modulating process. A cyclic redundancy check (CRC) is attached to a DCI message payload, and the CRC may be scrambled by a radio network temporary identifier (RNTI) corresponding to an identity of the terminal. Different RNTIs may be used depending on a purpose of a DCI message, for example, terminal (UE)-specific data transmission, power control command, or random access response. In other words, the RNTI is not explicitly transmitted, but may be transmitted by being included in a CRC calculation process. Upon receiving the DCI message transmitted on the PDCCH, the terminal may check the CRC by using an assigned RNTI, and when a result of checking the CRC is correct, the terminal may determine that the corresponding message is transmitted to the terminal.

For example, DCI scheduling PDSCH for system information (SI) may be scrambled by an SI-RNTI. DCI scheduling PDSCH for a random access response (RAR) message may be scrambled by an RA-RNTI. DCI scheduling PDSCH for a paging message may be scrambled by a P-RNTI. DCI notifying a slot format indicator (SFI) may be scrambled by an SFI-RNTI. DCI notifying transmit power control (TPC) may be scrambled by a TPC-RNTI. DCI scheduling terminal-specific PDSCH or PUSCH may be scrambled by cell RNTI (C-RNTI). However, the present disclosure is not limited to the above examples.

A DCI format 0_0 may be used as fallback DCI scheduling PUSCH and at this time, a CRC may be scrambled by a C-RNTI. The DCI format 0_0 of which the CRC is scrambled by the C-RNTI may include information of Table 2. However, the present disclosure is not limited to examples below.

TABLE 2

Identifier for DCI formats - [1] bit
Frequency domain resource assignment-
[⌈ $\log_2 (N_{RB}^{UL,BWP}(N_{RB}^{UL,BWP} + 1)/2)$ ⌉ ] bits
Time domain resource assignment- X bits
Frequency hopping flag- 1 bit.
Modulation and coding scheme- 5 bits
New data indicator - 1 bit
Redundancy version - 2 bits
HARQ process number - 4 bits
TPC command for scheduled PUSCH - [2] bits
UL/SUL indicator - 0 or 1 bit A DCI format 0_1 may be used as non-fallback DCI scheduling PUSCH and at this time, a CRC may be scrambled by a C-RNTI. The DCI format 0_1 of which the CRC is scrambled by the C-RNTI may include information of Table 3. However, the present disclosure is not limited to examples below.

TABLE 3

Carrier indicator - 0 or 3 bits
UL/SUL indicator - 0 or 1 bit
Identifier for DCI formats - [1] bits
Bandwidth part indicator - 0, 1 or 2 bits
Frequency domain resource assignment
    For resource allocation type 0, ⌈ $N_{RB}^{UL,BWP}/P$ ⌉ bits
    For resource allocation type 1, ⌈ $\log_2 (N_{RB}^{UL,BWP}(N_{RB}^{UL,BWP} + 1)/2)$ ⌉ bits
Time domain resource assignment -1, 2, 3, or 4 bits
VRB-to-PRB mapping - 0 or 1 bit, only for resource allocation type 1.
    0 bit if only resource allocation type 0 is configured;
    1 bit otherwise.
Frequency hopping flag - 0 or 1 bit, only for resource allocation type 1.
    0 bit if only resource allocation type 0 is configured;
    1 bit otherwise.
Modulation and coding scheme - 5 bits
New data indicator - 1 bit
Redundancy version - 2 bits
HARQ process number - 4 bits
1st downlink assignment index - 1 or 2 bits
    1 bit for semi-static HARQ-ACK codebook;
    2 bits for dynamic HARQ-ACK codebook with single HARQ-ACK codebook.
2nd downlink assignment index - 0 or 2 bits
    2 bits for dynamic HARQ-ACK codebook with two HARQ-ACK sub-
    codebooks;
    0 bit otherwise.
TPC command for scheduled PUSCH - 2 bits $$SRS \text{ resource indicator} - \left\lceil \log_2\left(\sum_{k=1}^{L_{max}} \binom{N_{SRS}}{k}\right) \right\rceil \text{ or } \lceil \log_2(N_{SRS}) \rceil \text{ bits}$$

$\left\lceil \log_2\left(\sum_{k=1}^{L_{max}} \binom{N_{SRS}}{k}\right) \right\rceil$ bits for non-codebook based *PUSCH* transmission.

⌈$\log_2(N_{SRS})$⌉ bits for codebook based PUSCH transmission.
Precoding information and number of layers -up to 6 bits
Antenna ports - up to 5 bits
SRS request - 2 bits TABLE 3-continued CSI request - 0, 1, 2, 3, 4, 5, or 6 bits
CBG transmission information - 0, 2, 4, 6, or 8 bits
PTRS-DMRS association - 0 or 2 bits.
beta_offset indicator - 0 or 2 bits
DMRS sequence initialization - 0 or 1 bit A DCI format 1_0 may be used as fallback DCI scheduling PDSCH and at this time, a CRC may be scrambled by a C-RNTI. The DCI format 1_0 of which the CRC is scrambled by the C-RNTI may include information of Table 4. However, the present disclosure is not limited to examples below.

TABLE 4

Identifier for DCI formats - [1] bit
Frequency domain resource assignment -
[⌈log$_2$ ($N_{RB}^{DL,BWP}$ ($N_{RB}^{DL,BWP}$ + 1)/2)⌉] bits
Time domain resource assignment - X bits
VRB-to-PRB mapping - 1 bit.
Modulation and coding scheme - 5 bits
New data indicator - 1 bit
Redundancy version - 2 bits
HARQ process number - 4 bits
Downlink assignment index - 2 bits
TPC command for scheduled PUCCH - [2] bits
PUCCH resource indicator - 3 bits
PDSCH-to-HARQ feedback timing indicator - [3] bits A DCI format 1_1 may be used as non-fallback DCI scheduling PDSCH and at this time, a CRC may be scrambled by a C-RNTI. The DCI format 1_1 of which the CRC is scrambled by the C-RNTI may include information of Table 5. However, the present disclosure is not limited to examples below.

TABLE 5

Carrier indicator - 0 or 3 bits
Identifier for DCI formats - [1] bits
Bandwidth part indicator - 0, 1 or 2 bits
Frequency domain resource assignment
For resource allocation type 0, ⌈$N_{RB}^{DL,BWP}$ / P⌉ bits
For resource allocation type 1,
⌈log$_2$($N_{RB}^{DL,BWP}$ ($N_{RB}^{DL,BWP}$ + 1) / 2)⌉ bits
Time domain resource assignment -1, 2, 3, or 4 bits
VRB-to-PRB mapping - 0 or 1 bit, only for resource allocation type 1.
0 bit if only resource allocation type 0 is configured;
1 bit otherwise.
PRB bundling size indicstor - 0 or 1 bit
Rate matching indicator - 0, 1, or 2 bits
ZP CSI-RS trigger - 0, 1, or 2 bits
For transport block 1:
Modulation and coding scheme - 5 bits
New data indicator - 1 bit
Redundancy version - 2 bits
For transport block 2:
Modulation and coding scheme - 5 bits
New data indicator - 1 bit
Redundancy version - 2 bits
HARQ process number - 4 bits
Downlink assignment index - 0 or 2 or 4 bits
TPC command for scheduled PUCCH - 2 bits
PUCCH resource indicator - 3 bits
PDSCH-to-HARQ_feedback timing indicator - 3 bits TABLE 5-continued Antenna ports - 4, 5, or 6 bits
Transmission configuration indication - 0 or 3 bits
SRS requefst - 2 bits
CBG transmission information - 0, 2, 4, 6, or 8 bits
CBG flushing out information - 0 or 1 bit
DMRS sequence initialization - 1 bit Next, a method of transmitting PUSCH in the 5G system will be described in detail.

According to some embodiments, a method by which a terminal transmits PUSCH to a base station may be largely classified as a grant-based transmission scheme and a grant free-based transmission scheme.

In a grant-based PUSCH transmission scheme, when traffic to be transmitted by a terminal to a base station has occurred, the terminal may transmit a scheduling request message to the base station via PUCCH, and the base station that received the scheduling request message may transmit, to the terminal, uplink scheduling DCI corresponding to scheduling grant. The terminal may receive uplink scheduling DCI via monitoring on PDCCH, and transmit PUSCH to the base station, based on control information notified via DCI.

In a grant free-based PUSCH transmission scheme, first, a base station may configure a semi-static time/frequency resource to a terminal via higher layer signaling (for example, radio resource control (RRC) signaling), and when traffic to be transmitted to the base station has occurred, the terminal may immediately transmit PUSCH from the configured time/frequency resource without grant of the base station.

Next, a transmitting structure for PUSCH transmission in the 5G system will be described.

Figure 3:
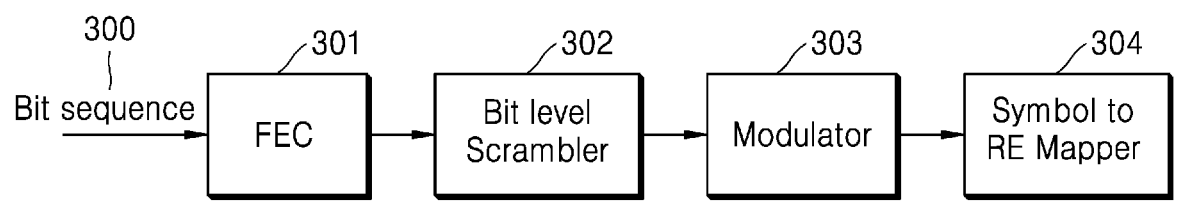
FIG. 3 is a diagram of a transmitting end structure in an orthogonal multiple access mode, in a 5G, LTE, or similar system, according to some embodiments.

FIG. 3 is a diagram of a transmitting end structure in an orthogonal multiple access mode, in a 5G, LTE, or similar system, according to some embodiments. Referring to FIG. 3, a transmitting end for PUSCH may include a forward error correction (FEC) 301, a bit level scrambler 302, a modulator 303, and an RE mapper 304. However, the present disclosure is not limited thereto, and the transmitting end for PUSCH may include more or fewer components than those shown in FIG. 3.

According to some embodiments, the FEC 301 may perform a function of performing channel coding on an input bit sequence 300. Also, the input bit sequence may be repeated.

The bit level scrambler 302 may perform a function of performing a scrambling operation on a bit sequence $d^{(q)}(0), \ldots, d^{(q)}(M_{symb}^{(q)}-1)$ of total Mbit bits output via the FEC 301. For example, a procedure of Table 6 may be followed. However, the present disclosure is not limited to examples below.

TABLE 6

The block f bits $b^{(q)}(0),\ldots,b^{(q)}(M_{bit}^{(q)} - 1)$, where $M_{bit}^{(q)}$ is the number of bits in codeword q transmitted on the physical channel, shall be scrambled prior to modulation, resulting in a block of scrambled bits $\tilde{b}^{(q)}(0),\ldots,\tilde{b}^{(q)}(M_{bit}^{(q)} - 1)$
according to the following pseudo code TABLE 6-continued

```
Set i = 0
while i < M_bit^(q)
    if b^(q)(i) = x //UCI placeholder bits
        b̃^(q)(i)=1
    else
        if b^(q)(i) = y // UCI placeholder bits
            b̃^(q)(i) = b̃^(q)(i-1)
        else
            b̃^(q)(i) = b^(q)(i)+c^(q)(i))mod2
        end if
    end if
    i = i + 1
end while
```
wher x and y are tags defined in [4, TS 38.212] and where the scrambling sequence $c^{(q)}(i)$ is given by clause 5.2.1. The scrambling generator shall be initialized with
$c_{init} = n_{RNTI} \cdot 2^{15} + n_{ID}$
where
$n_{ID} \in \{0,1,...,1023\}$ equal the higher-layer parameter dataScramblingIdentityPUSCHData-scrambling-Identity if configured and the RNTI equals the C-RNTI or CS-RNTI,
$n_{ID} = N_{ID}^{cell}$ otherwise
and where nRNTI corresponds to the RNTI associated with the PUSCH transmission as described in clause 6.1 of [6, TS 38.214].

According to some embodiments, the bit sequence $\tilde{b}^{(q)}(0), \ldots, \tilde{b}^{(q)}(M_{bit}^{(q)}-1)$ via the bit level scrambler 302 may be output as $M_{symb}$ modulated symbol sequences $d^{(q)}(0), \ldots, d^{(q)}(M_{symb}^{(q)}-1)$ via the modulator 303. In the 5G system, modulation schemes according to a modulation order of FIG. 7 may be supported. However, the present disclosure is not limited to examples below.

TABLE 7

| Transform precoding disabled | | Transform precoding enabled | |
|---|---|---|---|
| Modulation scheme | Modulation order $Q_m$ | Modulation scheme | Modulation order $Q_m$ |
|  |  | π/2-BPSK | 1 |
| QPSK | 2 | QPSK | 2 |
| 16QAM | 4 | 16QAM | 4 |
| 64QAM | 6 | 64QAM | 6 |
| 256QAM | 8 | 256QAM | 8 |

The modulated symbol sequences $d^{(q)}(0), \ldots, d^{(q)}(M_{symb}^{(q)}-1)$ via the modulator 303 may be mapped to time and frequency resources via the RE mapper 304 (symbol-to-RE mapping block) and transmitted.

TABLE 8

For each of the antenna ports used for transmission of the PUSCH, the block of complex-valued symbols $z_{(p)}(0),...z_{(p)}(M_{symb}^{ap} - 1)$ shall be multiplied with the amplitude scaling factor $\beta_{PUSCH}$ in order to conform to the transmit power specified in [5, TS 38.213] and mapped in sequence with $z^{(p)}(0)$ to resource elements $(k',l)_{p,\mu}$ in the virtual resource blocks assigned for transmission which meet all of the following criteria:
they are in the virtual resource blocks assigned for transmission, and
the corresponding resource elements in the corresponding physical resource blocks are not used for transmission of the associated DM-RS, PT-RS, or SM-RS intended for other co-scheduled UEs as described in clause 6.4.1.1.3
The mapping to resource elements $(k',l)_{p,\mu}$ allocated for PUSCH according to [6, TS 38.214] shall be in increasing order of the first the index k' over the assigned virtual resource blocks, where k' = 0 is the first subcarrier in the lowest-numbered virtual resource block assigned for transmission, and then the index l, with the starting position given by [6, TS 38.214].

Next, a transmitting structure for NOMA-based PUSCH transmission in the 5G system will be described.

Figure 4:
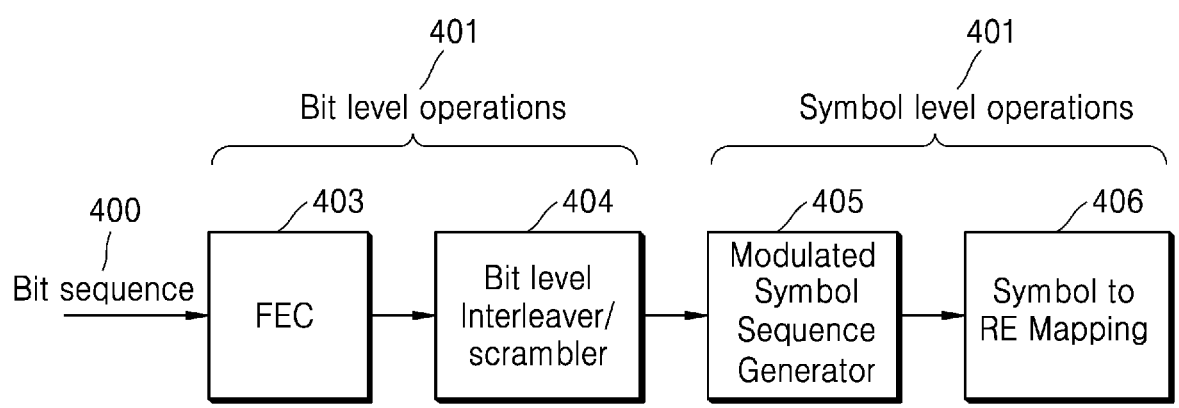
FIG. 4 is a diagram of a transmitting end structure in a non-orthogonal multiple access mode, in a 5G, LTE, or similar system, according to some embodiments.

FIG. 4 is a diagram of a transmitting end structure in a NOMA mode, in a 5G, LTE, or similar system, according to some embodiments. Referring to FIG. 4, an operation performed at a transmitting end for NOMA may include bit-level operations 401 and symbol-level operations 402.

According to some embodiments, an apparatus for performing the bit-level operations 401 may include an FEC 403 and a bit-level interleaver/scrambler 404. The FEC 403 may perform a function of performing channel coding on an input bit sequence 400. Also, the FEC 403 may repeat the input bit sequence. The bit-level interleaver/scrambler 404 may perform interleaving and scrambling operations on a bit output via the FEC 403. An interleaver/scrambler to be used in the bit-level interleaver/scrambler 404 may be cell-specific or terminal-specific, and accordingly, interference affecting another terminal transmitting a signal using same time and frequency resources may be randomized.

According to some embodiments, an apparatus performing the symbol-level operations 402 may include a modulated symbol sequence generator 405 and a symbol-to-RE mapping 406. Blocks of the modulated symbol sequence generator 405 and symbol-to-RE mapping 406 may include at least one of single or multi-one modulation, terminal-specific symbol spreading (via repetition), cell- and/or terminal-specific symbol-level interleaver/scrambler, sparse or non-sparse resource mapping, and a TPC function.

However, the transmitting end structure for NOMA is not limited to that shown in FIG. 4, and may be different from that of FIG. 4.

Terminals operating in NOMA may modulate uplink data to be transmitted according to the transmitting structure of FIG. 4 and transmit the same to a base station via PUSCH. A plurality of terminals performing NOMA may simultaneously transmit their own PUSCHs from same time and frequency resources. Accordingly, the PUSCHs of the plurality of terminals may interfere with each other. A base station that received the PUSCHs of the plurality of terminals performing NOMA may reconstruct uplink data of each terminal by using a receiver considering a transmitting structure.

Next, a receiving end structure for uplink NOMA being considered in the 5G system will be described in detail.

Figure 5:
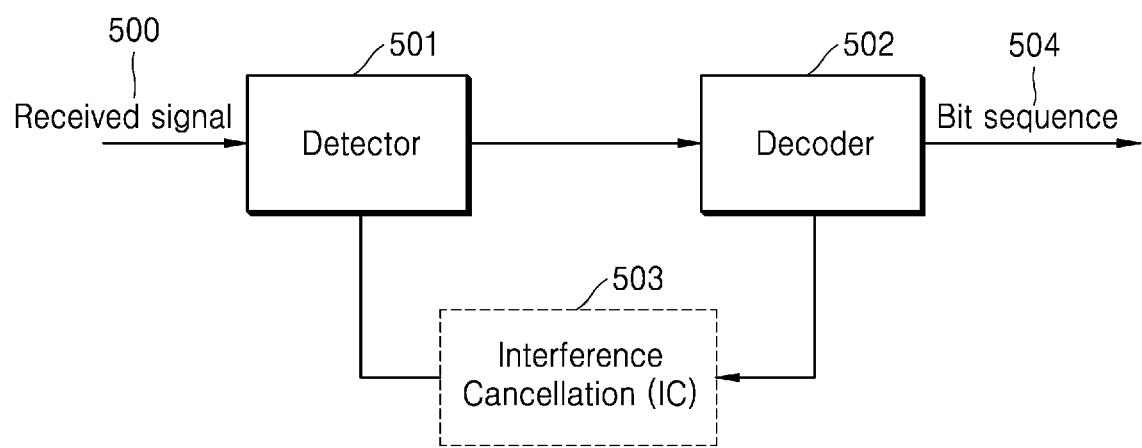
FIG. 5 is a diagram of a receiving end structure in a non-orthogonal multiple access mode, in a 5G, LTE, or similar system, according to some embodiments.

FIG. 5 is a diagram of a receiving end structure in a NOMA mode, in a 5G, LTE, or similar system, according to some embodiments.

FIG. 5 is a diagram of the receiving end structure for NOMA being discussed in the 5G system, and a receiving end may include blocks of a detector 501, a decoder 502, and an interference cancellation 503.

According to some embodiments, a signal 500 received by a receiver may have signal distortion due to a channel may be compensated for via the detector 501. An output signal via the detector 501 may be input to the decoder 502 such that a decoding process for channel coding is performed thereon. The output signal via the decoder 502 may pass through the interference cancellation 503 such that an additional interference cancellation operation is performed thereon. Here, the interference cancellation operation may include various signal processing techniques for, for example, removing signal interference between users in NOMA. An output value via the interference cancellation 503 may be input to the detector 501 again and the above-described procedures may be repeated. A final output value of the NOMA receiver after repetition may correspond to a bit sequence 504.

First Embodiment

As described above, when transmission and reception of an uplink data channel between a base station and a terminal are considered in a communication system supporting NOMA, a bit-level or symbol-level terminal-specific transmission technique may be applied to a transmitting end such that the base station distinguishes data channels transmitted from different terminals. The first embodiment of the present disclosure proposes a method of performing terminal-specific interleaving via the bit-level or symbol-level terminal-specific transmission technique. The terminal-specific interleaving denotes an interleaving method for outputting different output sequences by performing different interleavings on a same input sequence for each terminal. Each terminal may apply the terminal-specific interleaving on a data bit or symbol sequence, and the base station may determine a signal before interleaving by performing a de-interleaving operation regarding the interleaving corresponding to each terminal so as to detect (i.e., decode and modulate) data of a specific terminal.

1-1st Embodiment

In the 1-1st embodiment of the present disclosure, a block interleaving method below is considered as an interleaving method for a data bit or symbol sequence.

[Block Interleaving]

An input value of a block interleaver may correspond to an index of a (bit or symbol) sequence, i.e., d(0), d(1), d(2), . . . , or d(N−1), wherein N may correspond to a length of an input sequence. An output value of the block interleaver may follow, for example, procedures below.

(1) A size C of a column of a matrix of the block interleaver may be assigned. The columns of the matrix may be numbered 0 through C−1 from left to right.

A value of C may be pre-defined as a system parameter or may be notified by a base station to a terminal via higher layer signaling (for example, RRC or media access control (MAC) control element (CE) signaling) or layer 1 (L1) signaling (for example, DCI).

(2) A size R of a row of the matrix of the block interleaver may be determined to be a smallest value satisfying a condition below.

$$N \leq (R \times C)$$

The rows of the matrix may be numbered 0 through R−1 from top to bottom.

(3) When (R×C)>N, ND=(R×C−N) dummy indexes <NULL> may be inserted in front of(or behind) an input index sequence. For example, when <NULL> is inserted in front of the input index sequence, an index sequence y(k) considering the dummy index may be defined as below.

For k=0, 1, 2, . . . , and ND−1, y(k)=<NULL>
For k=0, 1, 2, . . . , and N−1, y(ND+k)=d(k)

For example, when <NULL> is inserted behind the input index sequence, the index sequence y(k) considering the dummy index may be defined as below.

For k=0, 1, 2, . . . , and N−1, y(k)=d(k)
For k=0, 1, 2, . . . , and ND−1, y(ND+k)=<NULL>

The index sequence y(k), wherein k=0, 1, 2, . . . , and N+ND−1, may be written in row-by-row as a below example, in the matrix of the block interleaver of a size (R×C).

$$\begin{bmatrix} y(0) & y(1) & y(2) & \cdots & y(C-1) \\ y(C) & y(C+1) & y(C+2) & \cdots & y(2C-1) \\ \vdots & \vdots & \vdots & \ddots & \vdots \\ y((R-1)\times C) & y((R-1)\times C+1) & y((R-1)\times C+2) & \cdots & y(R\times C-1) \end{bmatrix}$$

(4) Inter-column interleaving (or permutation in a same manner) may be additionally applied to the matrix of the block interleaver.

For example, when the inter-column interleaving is additionally applied and P(c) denotes a column index interleaved at a c-th time for an original column location with respect to a column index c ∈ {0, 1, 2, . . . , and C−1} of the matrix of the block interleaver, the matrix of the block interleaver of the size (R×C) after the inter-column interleaving is applied may be as follows.

$$\begin{bmatrix} y(P(0)) & y(P(1)) & y(P(2)) & \cdots & y(P(C-1)) \\ y(P(0)+C) & y(P(1)+C) & y(P(2)+C) & \cdots & y(P(C-1)+C) \\ \vdots & \vdots & \vdots & \ddots & \vdots \\ y(P(0))+(R-1)+C & y(P(1)+(R-1)+C) & y(P(2)+(R-1)+C) & \cdots & y(P(C-1)+(R-1)+C) \end{bmatrix}$$

A pattern for the inter-column interleaving may be defined as an interleaver function P(c) outputting a value of (P(c) for an input index c, and for example, when c=32, an interleaving pattern below may be applied.

TABLE 9

| Number of columns C | Inter-column permutation pattern < P(0), P(1),..., P(C−1) > |
|---|---|
| 32 | <1, 17, 9, 25, 5, 21, 13, 29, 3, 19, 11, 27, 7, 23, 15, 31, 0, 16, 8, 24, 4, 20, 12, 28, 2, 18, 10, 26, 6, 22, 14, 30> |

The inter-column interleaving may be omitted. In other words, P(c)=c.

(5) An output value of the block interleaver may correspond to an index sequence in which elements of the block interleaver of the size (R×C) are read in column-by-column. In other words, when an output index sequence after interleaving is defined as v(0), v(1), v(2), . . . , and v(K−1), v(0)=y(P(0)), v(1)=y(P(C)), . . . , and v(K−1)=y(P(R×C−1)).

Following methods may be additionally considered to specifically apply block interleaving to each terminal.

Method 1

Regarding a method of applying the inter-column interleaving described in the block interleaving method (4), different interleaving patterns may be applied for each terminal. For example, terminal #1 through terminal #K may respectively apply different interleaving patterns $P^1(\bullet)$ through $P^K(\bullet)$.) For example, when interleaving patterns $P^1(\bullet)$ and $P^2(\bullet)$ are defined as follows for C=10, $$<P^1(0),P^1(1),P^1(2), \ldots ,P^1(C-1)>=<6,1,7,4,9,5,8,3,10,2>$$

$$<P^2(0),P^2(1),P^2(2), \ldots ,P^2(C-1)>=<2,10,8,9,1,5,7,6,3,4>$$

The terminal #1 may use the interleaving pattern $P^1(\bullet)$ and the terminal #2 may use the interleaving pattern $P^2(\bullet)$. Following methods may be applied to determine an interleaving pattern to be used by each terminal.

Method 1-1

A base station may semi-statically configure an interleaving pattern to be used by a terminal via higher layer signaling (for example, cell-common or terminal-specific RRC signaling or MAC CE signaling). Between the base station and the terminal, an entire set $P_{set}=\{P^1(\bullet), P^2(\bullet), \ldots , P^K(\bullet)\}$ may be defined for an available interleaving pattern, and the base station may notify an index of an interleaving pattern to the terminal. In other words, when $P_{set}$ corresponds to an entire set configured with total K interleaving patterns, the base station may select one of indexes 1 through K and notify the selected index to the terminal.

Through Method 1-1, the base station may assign different interleaving patterns to the terminals, and each terminal may perform terminal-specific interleaving on a data bit or symbol sequence according to the assigned interleaving pattern.

Method 1-2

A base station may dynamically instruct a terminal of an interleaving pattern to be used via L1 signaling (for example, DCI). Between the base station and the terminal, a set $P_{set}=\{P^1(\bullet), P^2(\bullet) \ldots , P^K(\bullet)\}$ may be defined for an available interleaving pattern, and the base station may notify an index of an interleaving pattern to the terminal via DCI. In other words, when $P_{set}$ corresponds to an entire set configured with total K interleaving patterns, the base station may select one of indexes 1 through K and notify the selected index to the terminal. Alternatively, the base station may configure the terminal with an interleaving pattern set $P_{set,config}=\{P^1(\bullet), P^2(\bullet), \ldots , P^N(\bullet)\}$ via higher layer signaling (for example, cell-common or terminal-specific RRC signaling), and instruct the terminal, via L1 signaling, of one of interleaving patterns in the pattern set $P^{set,config}$ configured via the higher layer signaling.

Through Method 1-2, the base station may dynamically assign different interleaving patterns to the terminals. The base station may determine and dynamically instruct the interleaving pattern to be used by each terminal, based on scheduling information for uplink transmission. According to some embodiments, the scheduling information for uplink transmission may include information about time and frequency resources assigned to a plurality of terminals, a number of simultaneously scheduled terminals, and a power value for a data channel of each terminal, but is not limited thereto. The base station may configure the terminal with the interleaving pattern and each terminal may perform terminal-specific interleaving on a data bit or symbol sequence. In other words, the terminal may perform the terminal-specific interleaving on the data bit or symbol sequence, based on the interleaving pattern instructed by the base station.

Method 1-3

An interleaving pattern to be applied may be determined based on an ID or RNTI (C-RNTI, CS-RNTI, or RNTI defined for NOMA transmission) of a terminal. For example, between a base station and the terminal, an entire set $P_{set}=\{P^1(\bullet), P^2(\bullet), \ldots , P^K(\bullet)\}$ may be defined for an available interleaving pattern, and an index k of an interleaving pattern to be used by a specific terminal may be determined thereamong according to a following equation.

$$k = X\text{-RNTI modulo } K \qquad \text{Equation 1}$$

In Equation 1, X-RNTI may correspond to one of C-RNTI, CS-RNTI, or another RNTI configurable to the terminal (for example, RNTI configurable for NOMA). X modulo Y denotes a modulo function in which the remainder obtained by dividing X by Y is output.

Via Method 1-3, each terminal may determine the interleaving pattern to be used based on its ID (RNTI), and different interleaving patterns may be assigned to the terminals. Then, each terminal may perform terminal-specific interleaving on a bit or symbol sequence.

Method 1-4

In a method of determining a terminal-specific interleaving pattern, the terminal-specific interleaving pattern may be determined as a result of repeatedly performing a base interleaving pattern. For example, when the base interleaving pattern is $P^0(\bullet)$, interleaving patterns $P^1(\bullet)$, $P^2(\bullet)$, $P^3(\bullet)$, . . . , and $P^K(\bullet)$ may be defined as follows.

$$P^1(\bullet)=P^0(\bullet)$$

$$P^2(\bullet)=P_0(P^0(\bullet))$$

$$P^3(\bullet)=P^0(P^0(P^0(\bullet)))$$

$$P^K(\bullet)=P^0(P^0(P^0(\ldots P^0(\bullet))))$$

In other words, kth interleaving pattern $P^k(\bullet)$ may correspond to an interleaving pattern obtained as a result of repeatedly performing the base interleaving pattern $P^0(\bullet)$ k times. For example, when $P^0(\bullet)$, wherein C=10, is defined as $<P^1(0), P^1(1), P^1(2), \ldots , P^1(C-1)>=<6, 1, 7, 4, 9, 5, 8, 3, 10, 2>$, P1(•) and P2(•) may be defined as follows.

$$P^1(\bullet)=P^0(\bullet)=<P^1(0),P^1(1),P^1(2),\ldots,P^1(C-1)>=<6,1,7,4,9,5,8,3,10,2>$$

$$P^2(\bullet)=P^0(P(\bullet))=<P^2(0),P^2(1),P^2(2),\ldots,P^2(C-1)>=<5,6,8,4,10,9,3,7,2,1>$$

The base interleaving pattern $P^0(\bullet)$ may be pre-defined or notified from the base station to the terminal via higher layer signaling (for example, RRC or MAC CE signaling). The terminal may determine an interleaving pattern to be used by itself, based on the base interleaving pattern. At this time, as method of determining the interleaving pattern to be used by the terminal, the interleaving pattern $P^k(\bullet)$ may be determined based on the terminal ID (RNTI). Here, a value of k may be determined according to an equation below.

$$k=X\text{-RNTI} \qquad \text{Equation 2}$$

$$k=X\text{-RNTI modulo } K \qquad \text{Equation 3}$$

In Equations 2 and 3, X-RNTI may correspond to one of C-RNTI, CS-RNTI, or another RNTI configurable to the terminal (for example, RNTI configurable for NOMA). In Equation 3, K may correspond to a total number of different interleaving patterns capable of being generated based on the base interleaving pattern $P^0(\bullet)$. Alternatively, in Equation 3, K may be notified by the base station to the terminal via higher layer signaling (for example, RRC signaling or MAC CE signaling). Alternatively, in Equation 3, K may be implicitly determined by another system parameter (for example, a number of simultaneously scheduled terminals).

Via Method 1-4, the terminal-specific interleaving pattern may be further effectively assigned. When the base interleaving pattern is pre-defined, the terminal may self-determine the terminal-specific interleaving pattern to be used by itself without additional signaling. When the base station is capable of configuring the terminal with the base interleaving pattern via additional signaling, the base station may additionally notify the base interleaving pattern to the terminal for the use of various interleaving patterns.

According to some embodiments, Methods 1-1 through 1-4 may be operated in combination with each other.

The terminals may transmit data by applying different terminal-specific interleavings via Method 1. The base station may perform de-interleaving considering the terminal-specific interleaving applied to a specific terminal, while decoding and demodulating a data channel of the specific terminal.

Method 2

As a method of performing terminal-specific interleaving, indexes obtained by applying terminal-specific offsets on indexes d(1), d(2), ..., and d(N−1) of (bit or symbol) sequences input to a function of a block interleaver may be input. For example, when d(1), d(2), ..., and d(N−1) are sequence indexes before offsets are applied and d'(1), d'(2), ..., and d'(N−1) are sequence indexes after the offset are applied, following relationships may be obtained.

$$d'(n)=d(n)+W \text{ modulo } N \qquad \text{Equation 4}$$

In Equation 4, W may be defined as an offset value and W may correspond to a terminal ID (RNTI). A value of W may be notified by a base station to a terminal via higher layer signaling (for example, RRC signaling).

Method 3

As a method of performing terminal-specific interleaving, indexes obtained by applying terminal-specific offsets on indexes v(1), v(2), ..., and v(N−1) of (bit or symbol) sequences output from a function of a block interleaver may be output. For example, when v(1), v(2), ..., and v(N−1) are sequence indexes before offsets are applied and v'(1), v'(2), ..., and v'(N−1) are sequence indexes after the offset are applied, following relationships may be obtained.

$$v'(n)=v(n)+W \text{ modulo } N \qquad \text{Equation 5}$$

In Equation 5, W may be defined as an offset value and W may correspond to a terminal ID (RNTI). A value of W may be notified by a base station to a terminal via higher layer signaling (for example, RRC signaling).

Method 4

As a method of performing terminal-specific interleaving, sizes of columns or rows of a matrix of a block interleaver may be configured differently for each terminal. A base station may notify a terminal of a value of size R of the row or size C of column of the block interleaver via higher layer signaling (for example, RRC signaling). The terminal may perform block interleaving based on the value of configured size R of rows or configured size C of columns.

According to some embodiments, Methods 1 through 4 may be operated in combination with each other.

The terminals may transmit data by applying different terminal-specific interleavings via 1-1st Embodiment. The base station may perform de-interleaving considering the terminal-specific interleaving applied to a specific terminal, while decoding and demodulating a data channel of the specific terminal.

1-2nd Embodiment

In the 1-2nd embodiment of the present disclosure, an interleaving method based on an interleaving pattern below is considered as an interleaving method for a data bit or symbol sequence.

Interleaving Pattern-Based Interleaving

An input value of an interleaver may correspond to an index of a (bit or symbol) sequence, i.e., d(0), d(1), d(2), ..., or d(N−1), wherein N may correspond to a length of an input sequence. A function $P(\bullet)$ corresponding to an interleaving pattern may output an index sequence interleaved for the input sequence. In other words, when an output index sequence after interleaving is defined as v(0), v(1), v(2), ..., and v(K−1), v(0)=P(d(0)), v(1)=P(d(1)), ..., v(N−1)=P(d(N−1)). For example, the interleaving function when N=32 may be defined as Table 9.

The interleaving pattern-based interleaving may be very effective when a length N of a data sequence for performing interleaving is small. When the length N of the data sequence is small, it is possible to apply an optimum interleaving pattern in which randomness is highest, and thus a better performance than the block interleaving method of 1-1st Embodiment may be obtained.

To apply the interleaving pattern-based interleaving in a terminal-specific manner, Methods 1 through 3 of 1-1st Embodiment may be identically applied. Methods 1 through 3 will be described again below.

Method 1

Regarding a method of applying interleaving pattern-based interleaving, different interleaving patterns may be applied for each terminal. For example, terminal #1 through terminal #K may respectively apply different interleaving patterns $P^1(\bullet)$ through $P^K(\bullet)$. For example, when interleaving patterns $P^1(\bullet)$ and $P^2(\bullet)$ are defined as follows for C=10, $$<P^1(0),P^1(1),P^1(2),\ldots,P_1(C-1)>=<6,1,7,4,9,5,8,3,10,2>$$

$$<P^2(0),P^2(1),P^2(2),\ldots,P^2(C-1)>=<2,10,8,9,1,5,7,6,3,4>$$

The terminal #1 may use the interleaving pattern $P^1(\bullet)$ and the terminal #2 may use the interleaving pattern $P^2(\bullet)$. Following methods may be applied to determine an interleaving pattern to be used by each terminal.

Method 1-1

A base station may semi-statically configure an interleaving pattern to be used by a terminal via higher layer signaling (for example, cell-common or terminal-specific RRC signaling or MAC CE signaling). Between the base station and the terminal, an entire set $P_{set}=\{P^1(\bullet), P^2(\bullet), \ldots, P^K(\bullet)\}$ may be defined for an available interleaving pattern, and the base station may notify an index of an interleaving pattern to the terminal. In other words, when $P_{set}$ corresponds to an entire set configured with total K interleaving patterns, one of indexes 1 through K may be selected and the selected index may be notified to the terminal.

Through Method 1-1, the base station may assign different interleaving patterns to the terminals, and each terminal may perform terminal-specific interleaving on a data bit or symbol sequence according to the assigned interleaving pattern.

Method 1-2

A base station may dynamically instruct a terminal of an interleaving pattern to be used via L1 signaling (for example, DCI). Between the base station and the terminal, a set $P_{set}=\{P^1(\bullet), P^2(\bullet), \ldots, P^K(\bullet)\}$ may be defined for an available interleaving pattern, and the base station may notify an index of an interleaving pattern to the terminal via DCI. In other words, when $P_{set}$ corresponds to an entire set configured with total K interleaving patterns, the base station may select one of indexes 1 through K and notify the selected index to the terminal. Alternatively, the base station may configure the terminal with an interleaving pattern set $P_{set,config}=\{P^1(\bullet), P^2(\bullet), \ldots, P^N(\bullet)\}$ via higher layer signaling (for example, cell-common or terminal-specific RRC signaling), and instruct the terminal, via L1 signaling, of one of interleaving patterns in the pattern set $P^{set,config}$ configured via the higher layer signaling.

Through Method 1-2, the base station may dynamically assign different interleaving patterns to the terminals. The base station may determine and dynamically instruct the interleaving pattern to be used by each terminal, based on scheduling information for uplink transmission. According to some embodiments, the scheduling information for uplink transmission may include information about time and frequency resources assigned to a plurality of terminals, a number of simultaneously scheduled terminals, and a power value for a data channel of each terminal, but is not limited thereto. The base station may configure the terminal with the interleaving pattern and each terminal may perform terminal-specific interleaving on a data bit or symbol sequence. The terminal may perform the terminal-specific interleaving on the data bit or symbol sequence, based on the interleaving pattern instructed by the base station.

Method 1-3

An interleaving pattern to be applied may be determined based on an ID or RNTI (C-RNTI, CS-RNTI, or RNTI defined for NOMA transmission) of a terminal. For example, between a base station and the terminal, an entire set $P_{set}=\{P^1(\bullet), P^2(\bullet), P^K(\bullet)\}$ may be defined for an available interleaving pattern, and an index k of an interleaving pattern to be used by a specific terminal may be determined thereamong according to a following equation.

$$k=X\text{-RNTI modulo } K \quad \text{Equation 6}$$

In Equation 6, X-RNTI may correspond to one of C-RNTI, CS-RNTI, or another RNTI configurable to the terminal (for example, RNTI configurable for NOMA). X modulo Y denotes a modulo function in which the remainder obtained by dividing X by Y is output.

Via Method 1-3, each terminal may determine the interleaving pattern to be used based on its ID (RNTI), and different interleaving patterns may be assigned to the terminals. Then, each terminal may perform terminal-specific interleaving on a bit or symbol sequence.

Method 1-4

In a method of determining a terminal-specific interleaving pattern, the terminal-specific interleaving pattern may be determined as a result of repeatedly performing a base interleaving pattern. For example, when the base interleaving pattern is $P^0(\bullet)$, interleaving patterns $P^1(\bullet)$, $P^2(\bullet)$, $P^3(\bullet)$, ..., and $P^K(\bullet)$ may be defined as follows.

$$P^1(\bullet)=P^0(\bullet)$$

$$P^2(\bullet)=P^0(P^0(\bullet))$$

$$P^3(\bullet)=P^0(P^0(P^0(\bullet)))$$

$$P^K(\bullet)=P^0(P^0(P^0(\ldots P^0(\bullet))))$$

In other words, kth interleaving pattern $P^k(\bullet)$ may correspond to an interleaving pattern obtained as a result of repeatedly performing the base interleaving pattern $P^0(\bullet)$ k times. For example, when $P^0(\bullet)$, wherein C=10, is defined as $<P^1(0), P^1(1), P^1(2), \ldots, P^1(C-1)>=<6, 1, 7, 4, 9, 5, 8, 3, 10, 2>$, $P^1(\bullet)$ and $P^2(\bullet)$ may be defined as follows.

$$P^1(\bullet)=P^0(\bullet)=<P^1(0),P^1(1),P^1(2),\ldots,P^1(C-1)>=<6,1,7,4,9,5,8,3,10,2>$$

$$P^2(\bullet)=P^0(P^0(\bullet))=<P^2(0),P^2(1),P^2(2),\ldots,P^2(C-1)>=<5,6,8,4,10,9,3,7,2,1>$$

The base interleaving pattern $P^0(\bullet)$ may be pre-defined or notified from the base station to the terminal via higher layer signaling (for example, RRC or MAC CE signaling). The terminal may determine an interleaving pattern to be used by itself, based on the base interleaving pattern. At this time, as method of determining the interleaving pattern to be used by the terminal, the interleaving pattern $P^k(\bullet)$ may be determined based on the terminal ID (RNTI). Here, a value of k may be determined according to an equation below.

$$k=X\text{-RNTI} \quad \text{Equation 7}$$

$$k=X\text{-RNTI modulo } K \quad \text{Equation 8}$$

In Equations 7 and 8, X-RNTI may correspond to one of C-RNTI, CS-RNTI, or another RNTI configurable to the terminal (for example, RNTI configurable for NOMA). In Equation 8, K may correspond to a total number of different interleaving patterns capable of being generated based on the base interleaving pattern $P^0(\bullet)$. Alternatively, in Equation 8, K may be notified by the base station to the terminal via higher layer signaling (for example, RRC signaling or MAC CE signaling). Alternatively, in Equation 8, K may be implicitly determined by another system parameter (for example, a number of simultaneously scheduled terminals).

Via Method 1-4, the terminal-specific interleaving pattern may be further effectively assigned. When the base interleaving pattern is pre-defined, the terminal may self-determine the terminal-specific interleaving pattern to be used by itself without additional signaling. When the base station is capable of configuring the terminal with the base interleaving pattern via additional signaling, the base station may additionally notify the base interleaving pattern to the terminal for the use of various interleaving patterns.

According to some embodiments, Methods 1-1 through 1-4 may be operated in combination with each other.

Method 2

As a method of performing terminal-specific interleaving, indexes obtained by applying terminal-specific offsets on indexes d(1), d(2), . . . , and d(N−1) of (bit or symbol) sequences input to a function of an interleaver may be input. For example, when d(1), d(2), . . . , and d(N−1) are sequence indexes before offsets are applied and d'(1), d'(2), . . . , and d'(N−1) are sequence indexes after the offset are applied, following relationships may be obtained.]

$$d'(n)=d(n)+W \text{ modulo } N \quad \text{Equation 9}$$

In Equation 9, W may be defined as an offset value and W may correspond to a terminal ID (RNTI). A value of W may be notified by a base station to a terminal via higher layer signaling (for example, RRC signaling).

Method 3

As a method of performing terminal-specific interleaving, indexes obtained by applying terminal-specific offsets on indexes v(1), v(2), . . . , and v(N−1) of (bit or symbol) sequences output from a function of an interleaver may be output. For example, when v(1), v(2), . . . , and v(N−1) are sequence indexes before offsets are applied and v'(1), v'(2), . . . , and v'(N−1) are sequence indexes after the offset are applied, following relationships may be obtained.

$$v'(n)=v(n)+W \text{ modulo } N \quad \text{Equation 10}$$

In Equation 10, W may be defined as an offset value and W may correspond to a terminal ID (RNTI). A value of W may be notified by a base station to a terminal via higher layer signaling (for example, RRC signaling).

According to some embodiments, Methods 1 through 3 may be operated in combination with each other.

The terminals may transmit data by applying different terminal-specific interleavings via 1-2nd Embodiment. The base station may perform de-interleaving considering the terminal-specific interleaving applied to a specific terminal, while decoding and demodulating a data channel of the specific terminal.

Second Embodiment

In a communication system performing NOMA, a bit-level or symbol-level terminal-specific transmission technique may be applied to a transmitting end for a base station to distinguish data channels transmitted from different terminals. For example, following transmission techniques may be considered.

Terminal (UE)-specific bit-level scrambling
Terminal (UE)-specific bit-level interleaving
Terminal (UE)-specific symbol-level spreading
Terminal (UE)-specific symbol-level scrambling
Terminal (UE)-specific symbol-level interleaving with symbol-level zero padding
Terminal (UE)-specific power assignment
Terminal (UE)-specific sparse RE mapping The terminal-specific transmission techniques may be commonly referred to as a multiple access signature. Each terminal performing NOMA may modulate a data channel by using a terminal-specific multiple access signature, and the base station may distinguishably decode signals received from the different terminals based thereon.

The multiple access signature may be defined in a terminal-specific pattern and an index may be assigned to each pattern. For example, when terminal-specific interleaving is considered as the multiple access signature, $P^1(\bullet)$, $P^2(\bullet)$, $P^3(\bullet)$, and $P^K(\bullet)$ may be defined as total K terminal-specific interleaving patterns (see First Embodiment), and the patterns may be distinguished by indexes 1, 2, 3, . . . , K. In addition, the terminal-specific transmission techniques described above may all be distinguished by the terminals based on specific patterns and indexes.

A terminal-specific multiple access signature may be assigned to each terminal according to a pre-defined rule or may be notified by the base station as configuration information. A notifying method may vary depending on whether an uplink transmission method is grant-based transmission or grant free-based transmission. Hereinbelow, various embodiments of assigning and notifying a multiple access signature to a terminal will be described.

2-1st Embodiment 2-1st Embodiment of the present disclosure proposes a method of notifying a multiple access signature to terminals performing NOMA, in a grant-based PUSCH transmission scheme.

In the grant-based PUSCH transmission scheme, when traffic to be transmitted from a terminal to a base station has occurred, the terminal may transmit a scheduling request message to the base station via an uplink control channel and the base station that received the scheduling request message may transmit uplink scheduling DCI corresponding to scheduling grant to the terminal. The terminal may receive the uplink scheduling DCI via monitoring on PDCCH, and transmit PUSCH to the base station, based on control information notified via DCI. Accordingly, in the grant-based transmission scheme, it may be possible for the base station to dynamically instruct the multiple access signature to the terminal via L1 signaling, for example, DCI. For example, the multiple access signature may be notified via following method.

Method 1

A base station may configure a terminal with a multiple access signature candidate group set via higher layer signaling (for example, RRC signaling), and notify the terminal of an index about one signature to be used thereamong via L1 signaling (for example, DCI). For example, the base station may configure the terminal with one table $P_{set}=\{P_1, P_2, P_3, \ldots, P_K\}$ including K multiple access signature pattern candidate groups as RRC, and instruct one pattern index thereamong to the terminal via DCI. Upon instructed with the pattern index, the terminal may transmit a data channel by applying the corresponding multiple access signature.

Method 2

A base station may configure a terminal with a plurality of multiple access signature candidate group sets via higher layer signaling (for example, RRC signaling), and notify the terminal of an index about one signature candidate group set to be used thereamong via L1 signaling (for example, DCI). The terminal may select a specific signature in the instructed signature candidate group set according to a pre-defined rule, and use the specific signature to transmit a data channel.

For example, the base station may configure the terminal with N tables $P_{set,1}=\{P_{1,1}, P_{2,1}, P_{3,1}, \ldots, P_{K,1}\}$, $P_{set,2}=\{P_{1,2}, P_{2,2}, P_{3,2}, \ldots, P_{K,2}\}$, . . . , $P_{set,N}=\{P_{1,N}, P_{2,N}, P_{3,N}, \ldots, P_{K,N}\}$ including K multiple access signature pattern candidate groups via RRC signaling, and instruct the terminal of one table index thereamong via DCI. The terminal may select one signature in the table of which the index is instructed, and apply the signature to transmit the data channel. For example, when the terminal is instructed to use nth table $P_{set,n}=\{P_{1,n}, P_{2,n}, P_{3,n}, \ldots, P_{K,n}\}$, the terminal may select and use one of K signature candidate groups in $P_{set,n}$. In a method of selecting one of the K signature candidate groups in $P_{set,n}$, one of the K signature candidate groups in $P_{set,n}$ may be implicitly determined via a function for various system parameters (for example, terminal ID, cell ID, symbol index, RB index, and number of simultaneously scheduled terminals). According to some embodiments, the terminal may select a specific signature based on terminal ID (RNTI). For example, n=RNTI modulo K, wherein n may correspond to a selected signature index. Upon selecting the signature (pattern) index, the terminal may transmit a data channel by applying the corresponding multiple access signature.

Method 3

N tables $P_{set,1}=\{P_{1,1}, P_{2,1}, P_{3,1}, \ldots, P_{K,1}\}$, $P_{set,2}=\{P_{1,2}, P_{2,2}, P_{3,2}, \ldots, P_{K,2}\}, \ldots, P_{set,N}=\{P_{1,N}, P_{2,N}, P_{3,N}, \ldots, P_{K,N}\}$ including K multiple access signature pattern candidate groups may be pre-defined or may be configured by a base station to a terminal via higher layer signaling, for example, RRC signaling. The base station may notify the terminal of an index of one signature candidate group table among N tables via group-common DCI. The base station may notify the terminal of one signature index from among the K signature candidate groups in the table notified via the group-common DCI, via terminal-specific DCI. The terminal may pre-learn information about the N multiple access signature tables or may be configured with the information about the N multiple access signature tables by the base station via higher layer signaling (for example, RRC signaling), and obtain an index of one table to be used from among the N multiple access signature tables via the group-common DCI. The terminal may be additionally instructed, via the terminal-specific DCI, an index about a signature to be actually used by the terminal in the selected signature table. The terminal may finally transmit a data channel by applying the determined multiple access signature.

An optimal terminal-specific multiple access signature may be affected by various system parameters (for example, time and frequency resources, a number of simultaneously scheduled terminals, and a modulation and coding scheme (MSC)). It is possible for the base station to dynamically assign the optimal terminal-specific multiple access signature to the terminal at a specific time, via 2-1st Embodiment.

2-2nd Embodiment 2-2nd Embodiment of the present disclosure proposes a method of notifying a multiple access signature to terminals performing NOMA, in a grant free-based PUSCH transmission scheme.

In a grant free-based PUSCH transmission scheme, first, a base station may configure a semi-static time/frequency resource to a terminal via higher layer signaling (for example, radio resource control (RRC) signaling), and when traffic to be transmitted to the base station has occurred, the terminal may immediately transmit data from the configured time/frequency resource without grant of the base station. Accordingly, because it is impossible for the base station to dynamically assign a multiple access signature to the terminal via DCI in a grant free-based transmission scheme, the multiple access signature may be pre-configured via higher layer signaling. For example, the multiple access signature may be notified via following method.

Method 1

A base station may configure a terminal with multiple access signature candidate group set via higher layer signaling (for example, RRC signaling), and the terminal may select a specific signature from the configured signature candidate group set, based on a pre-defined rule, and use the specific signature to transmit a data channel.

In other words, the base station may configure the terminal with a table $P_{set}=\{P_1, P_2, P_3, \ldots, P_K\}$ including K multiple access signature pattern candidate groups via RRC, and the terminal may select one signature from the configured table and apply the selected signature to transmit the data channel. In a method of selecting one of the K signature candidate groups in $P_{set}$, one of the K signature candidate groups in $P_{set}$ may be implicitly determined via a function for various system parameters (for example, terminal ID, cell ID, time and frequency resource indexes, and a number of simultaneously scheduled terminals). According to some embodiments, the terminal may select a specific signature based on terminal ID (RNTI). For example, n=RNTI modulo K, wherein n may correspond to a selected signature index.

Through 2-2nd Embodiment, in the grant free-based transmission scheme, the base station may semi-statically configure the terminal with an optimal multiple access signature set, and the terminal may randomly select one multiple access signature from the configured set such that different terminals use different signatures.

2-3rd Embodiment 2-3rd Embodiment of the present disclosure proposes a method of randomizing a multiple access signature.

A terminal-specific multiple access signature pattern may be assigned by a base station to a terminal via various methods described with reference to 2-2nd Embodiment to be used for NOMA-based data channel transmission. When one multiple access signature pattern, for example, $P_k$, i.e., a kth pattern, is assigned from among a set $P_{set}=\{P_1, P_2, P_3, \ldots, P_K\}$ including K multiple access signature pattern candidate groups, the terminal may use $P_k$ to modulate a data channel (apply the terminal-specific transmission technique described above). Here, the terminal may apply the same signature $P_k$ in all time and frequency resources where the data channel is transmitted. When transmission is performed in same time and frequency resources as another terminal using a same signature, it may be difficult for the base station to perform decoding by distinguishing data channels of the terminals. Accordingly, 2-3rd Embodiment of the present disclosure proposes a method of randomizing a multiple access signature pattern based on time and frequency resource indexes.

For example, following methods may be performed.

Method 1

When one multiple access signature pattern, for example, $P_k$, i.e., a kth pattern, is assigned to a terminal from among a set $P_{set}=\{P_1, P_2, P_3, \ldots, P_K\}$ including K multiple access signature pattern candidate groups, the terminal may transmit a data channel by applying the assigned $P_k$, i.e., the kth signature pattern, in a slot n, and transmit a data channel by applying $P_{k+m}$, i.e., k+mth signature pattern, in a slot p.

Here, m may be defined as a function for a slot index. For example, m may follow Equation 11 below.

$$m = \text{slot index modulo } K \qquad \text{Equation 11}$$

It is possible to use different multiple access signature patterns depending on time via Method 1.

Method 2

When one multiple access signature pattern, for example, $P_k$, i.e., a kth pattern, is assigned to a terminal from among a set $P_{set}=\{P_1, P_2, P_3, \ldots, P_K\}$ including K multiple access signature pattern candidate groups, the terminal may transmit a data channel by applying the assigned $P_k$, i.e., the kth signature pattern, in an RB index n, and transmit a data channel by applying $P_{k+m}$, i.e., k+mth signature pattern, in an RB index p.

Here, m may be defined as a function for an RB index. For example, m may follow Equation 12 below.

$$m = RB \text{ index modulo } K \qquad \text{Equation 12}$$

It is possible to use different multiple access signature patterns depending on a frequency resource (RB index) via Method 2.

According to some embodiments, Methods 1 and 2 may be operated in combination with each other.

Figure 6:
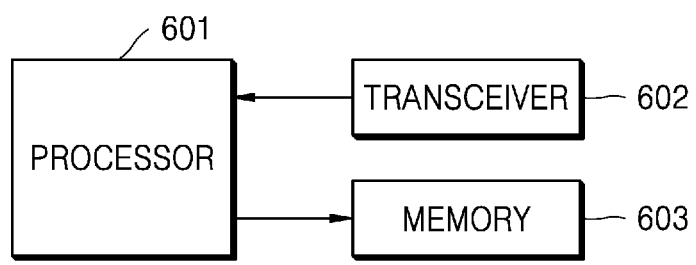
FIG. 6 is a block diagram of a structure of a terminal, according to some embodiments.

Transmitters, receivers, and controllers of a terminal and base station are respectively shown in FIGS. 6 and 6 to perform the above embodiments of the present disclosure. Transceivers, processors, and memories of a base station and terminal may operate according to the above-described embodiments to perform a method of transmitting an uplink data channel and a method of transmitting downlink control information for supporting NOMA in a 5G communication system corresponding to the above embodiments.

In detail, FIG. 6 is a block diagram of a structure of a terminal, according to some embodiments. As shown in FIG. 6, the terminal may include a processor 601, a transceiver 602, and a memory 603. However, the components of the terminal are not limited thereto. For example, the terminal may include more or fewer components than those described above. In addition, the processor 601, the transceiver 602, and the memory 603 may be implemented as a single chip.

The processor 601 may control a series of processes such that the terminal operates according to the embodiments of the present disclosure. For example, the processor 601 may differently control a method of performing terminal-specific interleaving and a method of operating a terminal-specific multiple access signature for NOMA, according to embodiments of the present disclosure.

The processor 601 may include a plurality of processors and may execute a program stored in the memory 603 to obtain pattern information used to determine a terminal-specific transmission pattern from a base station, process data according to a pattern determined according to the pattern information, and transmit the processed data. The pattern may include at least one of a block interleaving pattern, an interleaving pattern, and a multiple access signature pattern described above, but is not limited thereto. The pattern information is information that may be used to determine the pattern and may include information about all of an entire pattern set, an index, a function, an offset, a pattern candidate group, and a base pattern, but is not limited thereto.

The transceiver 602 may transmit or receive a signal to or from the base station. The signal transmitted or received to or from the base station may include control information and data. According to some embodiments, the transceiver 602 may include a RF transmitter for up-converting and amplifying a frequency of a transmitted signal, and a RF receiver for amplifying low-noise and down-converting a frequency of a received signal. However, this is only an embodiment of the transceiver 602 and components of the transceiver 602 are not limited to the RF transmitter and the RF receiver. Also, the transceiver 602 may receive and output, to the processor 601, a signal through a wireless channel, and transmit a signal output from the processor 601 through the wireless channel.

According to some embodiments, the memory 603 may store a program and data required for operations of the terminal. Also, the memory 603 may store the control information or data included in the signal transmitted and received by the terminal. The memory 603 may be a storage medium, such as read-only memory (ROM), random access memory (RAM), a hard disk, a CD-ROM, and a DVD, or a combination of storage media. Also, the memory 603 may be configured in a plurality of memories. According to some embodiments, the memory 603 may store a program for supporting NOMA and store a program for transmitting or receiving the pattern information for configuring at least one of the block interleaving pattern, the interleaving pattern, and the multiple access signature pattern for supporting NOMA described above and for determining the pattern.

Figure 7:
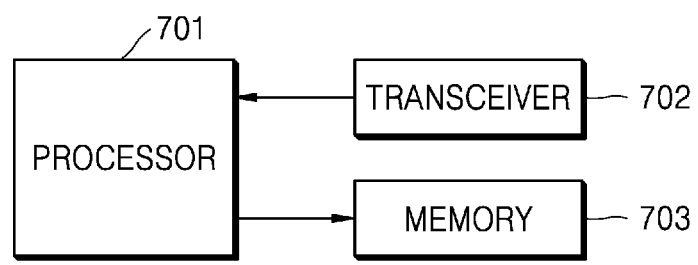
FIG. 7 is a block diagram of a structure of a base station, according to some embodiments.

FIG. 7 is a block diagram of a structure of a base station, according to some embodiments. As shown in FIG. 7, the base station according to the present disclosure may include a processor 701, a transceiver 702, and a memory 703. However, the components of the base station are not limited thereto. For example, the base station may include more or fewer components than those described above. In addition, the processor 701, the transceiver 702, and the memory 703 may be implemented as a single chip.

According to some embodiments, the processor 701 may control a series of processes for the base station to operate according to embodiments of the present disclosure described above. For example, the processor 701 may differently control a method of configuring a multiple access signature and a method of configuring terminal-specific interleaving, according to an embodiment of the present disclosure. The processor 701 may include a plurality of processors and may execute a program stored in the memory 703 to provide, to a terminal, pattern information used to determine a terminal-specific transmission pattern, receive data processed according to a determined pattern, and process the data received according to the determined pattern for each terminal. The pattern may include at least one of a block interleaving pattern, an interleaving pattern, and a multiple access signature pattern described above, but is not limited thereto. The pattern information is information that may be used to determine the pattern and may include information about all of an entire pattern set, an index, a function, an offset, a pattern candidate group, and a base pattern, but is not limited thereto.

According to some embodiments, the transceiver 702 may transmit and receive signals with the terminal. The signal transmitted or received to or from the terminal may include control information and data. According to some embodiments, the transceiver 702 may include a RF transmitter for up-converting and amplifying a frequency of a transmitted signal, and a RF receiver for amplifying low-noise and down-converting a frequency of a received signal. However, this is only an embodiment of the transceiver 702 and components of the transceiver 702 are not limited to the RF transmitter and the RF receiver. Also, the transceiver 702 may receive and output, to the processor 701, a signal through a wireless channel, and transmit a signal output from the processor 701 through the wireless channel.

According to some embodiments, the memory 703 may store a program and data required for operations of the base station. Also, the memory 703 may store the control information or data included in the signal transmitted and received by the base station. The memory 703 may be a storage medium, such as read-only memory (ROM), random access memory (RAM), a hard disk, a CD-ROM, and a DVD, or a combination of storage media. Also, the memory 703 may be configured in a plurality of memories. According to some embodiments, the memory 703 may store a program for supporting NOMA and store a program for transmitting or receiving the pattern information for configuring at least one of the block interleaving pattern, the interleaving pattern, and the multiple access signature pattern for supporting NOMA described above and for determining the pattern.

The methods according to the embodiments described in the claims or the detailed description of the present disclosure may be implemented in hardware, software, or a combination of hardware and software.

When the electrical structures and methods are implemented in software, a computer-readable recording medium having one or more programs (software modules) recorded thereon may be provided. The one or more programs recorded on the computer-readable recording medium are configured to be executable by one or more processors in a device. The one or more programs include instructions to execute the methods according to the embodiments described in the claims or the detailed description.

The programs (e.g., software modules or software) may be stored in random access memory (RAM), non-volatile memory including flash memory, read-only memory (ROM), electrically erasable programmable read-only memory (EEPROM), a magnetic disc storage device, compact disc-ROM (CD-ROM), a digital versatile disc (DVD), another type of optical storage device, or a magnetic cassette. Alternatively, the programs may be stored in a memory system including a combination of some or all of the above-mentioned memory devices. In addition, each memory device may be included by a plural number.

The programs may also be stored in an attachable storage device which is accessible through a communication network such as the Internet, an intranet, a local area network (LAN), a wireless LAN (WLAN), or a storage area network (SAN), or a combination thereof. The storage device may be connected through an external port to an apparatus according to the embodiments of the present disclosure. Another storage device on the communication network may also be connected to the apparatus performing the embodiments of the present disclosure.

In the afore-described embodiments of the present disclosure, elements included in the present disclosure are expressed in a singular or plural form according to the embodiments. However, the singular or plural form is appropriately selected for convenience of explanation and the present disclosure is not limited thereto. As such, an element expressed in a plural form may also be configured as a single element, and an element expressed in a singular form may also be configured as plural elements.

Meanwhile, the embodiments of the present disclosure described with reference to the present specification and the drawings are merely illustrative of specific examples to easily facilitate description and understanding of the present disclosure, and are not intended to limit the scope of the present disclosure. In other words, it will be apparent to one of ordinary skill in the art that other modifications based on the technical ideas of the disclosure are feasible. Also, the embodiments may be combined with each other as required. For example, a portion of one embodiment of the present disclosure and a portion of another embodiment of the present disclosure may be combined with each other to enable a base station and a terminal to operate. Further, the embodiments of the present disclosure are also applicable to another communication system, and other modifications based on technical ideas of the embodiments are also feasible.

The invention claimed is:

1. A communication method using a non-orthogonal multiple access (NOMA) scheme by a terminal, the communication method comprising:
  receiving, from a base station, configuration information about a transmission pattern assigned to the terminal, wherein the configuration information comprises at least one transmission pattern candidate set;
  selecting a transmission pattern among the at least one transmission pattern candidate set based on at least one of an identifier of the terminal or a certain radio network temporary identifier (RNTI) corresponding to the terminal;
  determining a terminal-specific transmission pattern per slot or resource block (RB) by which the terminal is configured to transmit data, by performing randomization based on the selected transmission pattern and at least one of an index of the slot or the RB;
  processing the data to be transmitted in at least one of the slot or the RB, based on the determined terminal-specific transmission pattern; and
  transmitting, to the base station, using the NOMA scheme, the processed data in the at least one of the slot or the RB.

2. The communication method of claim 1, wherein the configuration information is received via higher layer signaling or layer 1 (L1) signaling.

3. The communication method of claim 1, wherein the configuration information comprises base pattern information.

4. The communication method of claim 3,
  wherein the selecting of the transmission pattern comprises identifying a number of repeated applications of the base pattern information, and
  wherein the number of repeated applications is identified based on the at least one of the identifier of the terminal or the certain RNTI corresponding to the terminal.

5. The communication method of claim 1, wherein the processing of the data to be transmitted, based on the determined terminal-specific transmission pattern comprises performing at least one of bit-wise scrambling, bit-wise interleaving, symbol-wise spreading, symbol-wise interleaving, power assignment control, and resource element (RE) assignment control on the data to be transmitted, based on the determined terminal-specific transmission pattern.

6. The communication method of claim 1, wherein the terminal-specific transmission pattern includes an inter-column interleaving pattern.

7. A communication method using a non-orthogonal multiple access (NOMA) scheme by a base station, the communication method comprising:
  transmitting, to a plurality of terminals, configuration information about a transmission pattern assigned to each terminal of the plurality of terminals, wherein the configuration information comprises at least one transmission pattern candidate set;
  receiving data, from at least two terminals among the plurality of terminals, using the NOMA scheme, in at least one of a slot or a resource block (RB); and
  distinguishing data corresponding to each of the at least two terminals from the received data, based on a terminal-specific transmission pattern of each of the at least two terminals and an identifier of each of the at least two terminals, wherein the data is processed by each of the at least two terminals, according to the terminal-specific transmission pattern per slot or RB determined by performing randomization among the at least one transmission pattern candidate set based on at least one of an index of the slot or the RB.

8. The communication method of claim 7, wherein the configuration information is transmitted via higher layer signaling or layer 1 (L1) signaling.

9. A terminal using a non-orthogonal multiple access (NOMA) scheme, the terminal comprising:
a transceiver; and
at least one controller coupled with the transceiver and configured to:
receive, from a base station, configuration information about a transmission pattern assigned to the terminal, wherein the configuration information comprises at least one transmission pattern candidate set,
select a transmission pattern among the at least one transmission pattern candidate set based on at least one of an identifier of the terminal or a certain radio network temporary identifier (RNTI) corresponding to the terminal,
determine a terminal-specific transmission pattern per a-slot or a resource block (RB) by which the terminal is configured to transmit data, by performing randomization based on the selected transmission pattern and at least one of an index of the slot or the RB,
process the data to be transmitted in at least one of the slot or the RB based on the determined terminal-specific transmission pattern, and
transmit, to the base station, using the NOMA scheme, the processed data in the at least one of the slot or the RB.

10. The terminal of claim 9, wherein the at least one controller is further configured to receive the configuration information via higher layer signaling or L1 signaling.

11. The terminal of claim 9, wherein the configuration information comprises base pattern information.

12. The terminal of claim 11,
wherein the at least one controller is further configured to identify a number of repeated applications of the base pattern information, and
wherein the number of repeated applications is identified based on the at least one of the identifier of the terminal or the certain RNTI corresponding to the terminal.

13. A base station using a non-orthogonal multiple access scheme, the base station comprising:
a transceiver; and
at least one controller coupled with the transceiver and configured to:
transmit, to a plurality of terminals, configuration information about a transmission pattern assigned to each terminal of the plurality of terminals, wherein the configuration information comprises at least one transmission pattern candidate set,
receive data, from at least two terminals among the plurality of terminals, using the NOMA scheme, in at least one of a slot or a resource block (RB), and
distinguish data corresponding to each of the at least two terminals from the received data, based on a terminal-specific transmission pattern of each of the at least two terminals and an identifier of each of the at least two terminals,
wherein the data is processed by each of the at least two terminals, according to the terminal-specific transmission pattern per slot or RB determined by performing randomization among the at least one transmission pattern candidate set based on at least one of an index of the slot or the RB.

* * * * *